United States Patent
Rondeau et al.

(10) Patent No.: US 7,982,863 B2
(45) Date of Patent: Jul. 19, 2011

(54) BIAXIAL LASER ANEMOMETRY PROBE

(75) Inventors: Philippe Rondeau, Saint Marcel lés Valence (FR); Jean-Pierre Schlotterbeck, Rochefort-Samson (FR)

(73) Assignee: Thales (FR)

( * ) Notice: Subject to any disclaimer, the term of this patent is extended or adjusted under 35 U.S.C. 154(b) by 84 days.

(21) Appl. No.: 12/628,582

(22) Filed: Dec. 1, 2009

(65) Prior Publication Data

US 2010/0134780 A1 Jun. 3, 2010

(30) Foreign Application Priority Data

Dec. 2, 2008 (FR) ...................................... 08 06767

(51) Int. Cl.
*G01P 3/36* (2006.01)
(52) U.S. Cl. ..................... 356/28.5; 356/28; 250/574
(58) Field of Classification Search ........ 356/3.01–3.15, 356/4.01–4.1, 5.01–5.15, 6–22, 28, 28.5; 250/561, 574
See application file for complete search history.

(56) References Cited

U.S. PATENT DOCUMENTS 5,053,630 A * 10/1991 Hausamann et al. ......... 250/574
2004/0036852 A1 2/2004 Bruel et al.

FOREIGN PATENT DOCUMENTS

WO 02/50565 A1 6/2002

OTHER PUBLICATIONS

Hisami Nishi, et al., "Complementary 2 Dimensional Laser Doppler Velocimeter With an Optical Fiber Probe", Proceedings of the SPIE—The International Society for Optical Engineering, 1990, pp. 257-263, vol. 1267.

* cited by examiner

*Primary Examiner* — Thomas H Tarcza
*Assistant Examiner* — Luke D Ratcliffe
(74) *Attorney, Agent, or Firm* — Baker & Hostetler

(57) ABSTRACT

The subject of the present invention is a laser anemometry probe for optical homodyne detection of frequency offset by Doppler effect, comprising two devices (DERF1, DERF2) for transmitting/receiving beams in two different directions, avoiding duplicating a plurality of elements of a mono-axial laser anemometry probe.

9 Claims, 3 Drawing Sheets

BIAXIAL LASER ANEMOMETRY PROBE

CROSS-REFERENCE TO RELATED APPLICATIONS

This application claims priority of foreign French patent application no. FR 0806767, filed Dec. 2, 2008, the disclosure of which is hereby incorporated by reference in its entirety.

BACKGROUND OF THE INVENTION

The present invention relates to a laser anemometry probe for optical homodyne detection of frequency offset by Doppler effect.

Mono-axial laser anemometry probes are known that are used to measure aircraft speeds relative to the surrounding environment.

This type of probe is based on a technique consisting in measuring the frequency offset, representative of the relative speed in relation to the air, between a laser beam emitted into the atmosphere and the beam backscattered by the natural aerosols in the air, used as wind field tracers. The expression longitudinal Doppler laser anemometry is used because the frequency offset that results from the Doppler effect is directly proportional to the projection of the speed vector on the line of sight.

The useful information, conveyed by the Doppler frequency offset, is obtained by performing a coherent-type detection; a beam deriving from a coherent light source, for example a laser, is separated into two beams. A first beam called signal beam is sent into the measurement area and a second beam called reference beam or local oscillator constitutes a reference for detection of the Doppler frequency offset.

It is known to use, notably on board aircraft, mono-axial laser anemometry probes, operating at short distances, by means of which a projection of the relative speed vector of the aircraft in relation to the air is obtained on a measurement axis. The local angles of incidence and of sideslip of an aircraft can vary strongly, so it is almost impossible to directly obtain the norm of the relative speed vector in relation to the air.

As illustrated in FIG. 1, a mono-axial laser anemometry probe comprises a laser source SL supplying a linearly polarized reference wave, a separator SEP separating the signal originating from the laser source SL into a signal transmitted to an amplifier AMP and a signal transmitted to a coupler with maintained polarization CPLMP. The mono-axial laser anemometry probe also comprises a device DERF for transmitting/receiving beams in the direction of the axis of the probe, and a backscattered beam separator SFRD arranged between the amplifier AMP and the transmitter/receiver device DERF and transmitting the signal originating from the amplifier AMP to the transmitter/receiver device DERF. The signal backscattered by the transmitter/receiver device DERF is transmitted by the backscattered beam separator SFRD to the coupler with maintained polarization CPLMP. The mono-axial laser anemometry probe furthermore comprises a polarization consistency element EMCP arranged upstream of the coupler with maintained polarization CPLMP in order to ensure that the backscattered signal and the reference wave have the same polarization at the input of the coupler with maintained polarization CPLMP, and a balanced detector DETEQ arranged downstream of the coupler with maintained polarization CPLMP. The coupler with maintained polarization CPLMP supplies on each output pathway half of the backscattered signal and half of the reference wave. The two output signals from the coupler with maintained polarization are transmitted to the balanced detector DETEQ which, for example, comprises two diodes, and delivers as output the difference in the signals supplied by the two diodes. The portion of each signal changing channel in the coupler with maintained polarization CPLMP undergoes a phase delay and the beat produced upon the detection on the two diodes of the balanced detector DETEQ are in phase opposition. The differential output therefore makes it possible to add together the received signal powers. The output signal from the balanced detector DETEQ is then transmitted to an electronic control unit, not represented, to be processed.

The association of two mono-axial laser anemometry probes, with non-parallel axes, makes it possible to obtain the projection of the relative speed vector in relation to the air in a plane defined by these two non-parallel axes. Close to the outer envelope of the aircraft, the relative speed of the aircraft in relation to the air can be only little inclined relative to the outer envelope of the aircraft, which makes it possible, from the projection of the relative speed in a plane containing the two non-parallel axes of the two probes, to determine with sufficient accuracy the relative speed vector in three dimensions of the aircraft in relation to the surrounding air.

The combination of two mono-axial probes forming a biaxial probe is expensive, and the duplication of certain elements increases the risks of failures.

One aim of the invention is to overcome these problems.

SUMMARY OF THE INVENTION

There is proposed, according to one aspect of the invention, a laser anemometry probe for optical homodyne detection of frequency offset by Doppler effect, comprising a laser source supplying a linearly polarized reference wave, a first separator of the signal originating from the laser source into a signal transmitted to a first amplifier and a signal transmitted to a coupler with maintained polarization. The probe also comprises a first device for transmitting/receiving beams in a first direction, a first backscattered beam separator arranged between the first amplifier and the first transmitter/receiver device and transmitting the signal originating from the first amplifier to the first transmitter/receiver device, a polarization consistency element arranged upstream of the coupler with maintained polarization, and a balanced detector arranged downstream of the coupler with maintained polarization. The probe also comprises a second separator arranged between the laser source and the first separator to separate the signal obtained from the laser source into two signals addressed respectively to the first separator and a third separator for separating the signal originating from the laser source into a signal transmitted to a second amplifier and a signal transmitted to the coupler with maintained polarization, and a second device for transmitting/receiving beams in a second direction distinct from the first direction. The probe also comprises a second backscattered beam separator arranged between the second amplifier and the second transmitter/receiver device and transmitting the signal originating from the second amplifier to the second transmitter/receiver device. The probe is also provided with a first and a second return pathways for respectively transmitting the signal backscattered from the first backscattered beam separator at the input of the first separator, and the signal backscattered from the second backscattered beam separator at the input of the third separator.

Such a probe makes it possible to take measurements of the relative speed in relation to the air in two different directions, while avoiding the duplication of numerous elements of a mono-axial probe, notably the laser source, the first amplifier, the balanced detector, and even the processing of the output signal by an electronic computation unit to which the data output from the probe are transmitted.

According to one embodiment, the laser anemometry probe comprises a third amplifier arranged between the laser source and the second separator.

The addition of an amplifier directly at the output of the laser source makes it possible, with limited additional cost, to amplify the signal transmitted by the laser source for all of the biaxial probe.

For example, said polarization consistency element is arranged between the first separator and the coupler with maintained polarization, or between the third separator and the coupler with maintained polarization.

As a variant, said polarization consistency element is arranged between the second separator and the first separator, or between the second separator and the third separator.

The polarization consistency element can be arranged at these different positions of the probe, for an identical result.

According to one embodiment, the laser anemometry probe comprises frequency offset means arranged between the first separator and the coupler with maintained polarization, or between the third separator and the coupler with maintained polarization.

As a variant, the frequency offset means are arranged between the second separator and the first separator, or between the second separator and the third separator.

The frequency offset means can be arranged at these different positions of the probe, for an identical result.

In one embodiment, the second separator is a 50/50 separator, transmitting identical intensities on both its outputs, addressed to the first and third separators.

Thus, the powers of the signals transmitted on each of the measurement pathways are identical, which facilitates the power adjustments on the first and second amplifiers.

According to one embodiment, the first and third separators are 90/10 separators, transmitting 90% of the signal originating from the second separator to the corresponding amplifier, and the remaining 10% of the signal originating from the second separator to the coupler with maintained polarization, and transmitting 90% of the signal received via the corresponding return pathway to the coupler with maintained polarization, and the remaining 10% of the signal received via the corresponding return pathway to the corresponding amplifier.

Thus, only 10% of the power of the backscattered signal is not used because it is redirected to the corresponding amplifier of the corresponding measurement pathway, whereas 90% of the power is used in the coherent mixture of the coupler with maintained polarization CPLMP. Also, since 10% of the reference wave obtained from the second separator SEP2 is directed to the coupler with maintained polarization CPLMP, the power needed at the output of the third amplifier AMP3 is low.

According to another aspect of the invention, there is also proposed a method of etching on glass plate, by integrated optical technology, a laser anemometry probe as described previously.

The use of the integrated optical technology consisting in etching the optical waveguides on a glass plate allows for large-scale production at low cost.

BRIEF DESCRIPTION OF THE DRAWINGS

The invention will be better understood from studying a few embodiments described by way of nonlimiting examples and illustrated by the appended drawings in which.

In all of the figures, the elements that have the same references are similar.

DETAILED DESCRIPTION

Figure 1:
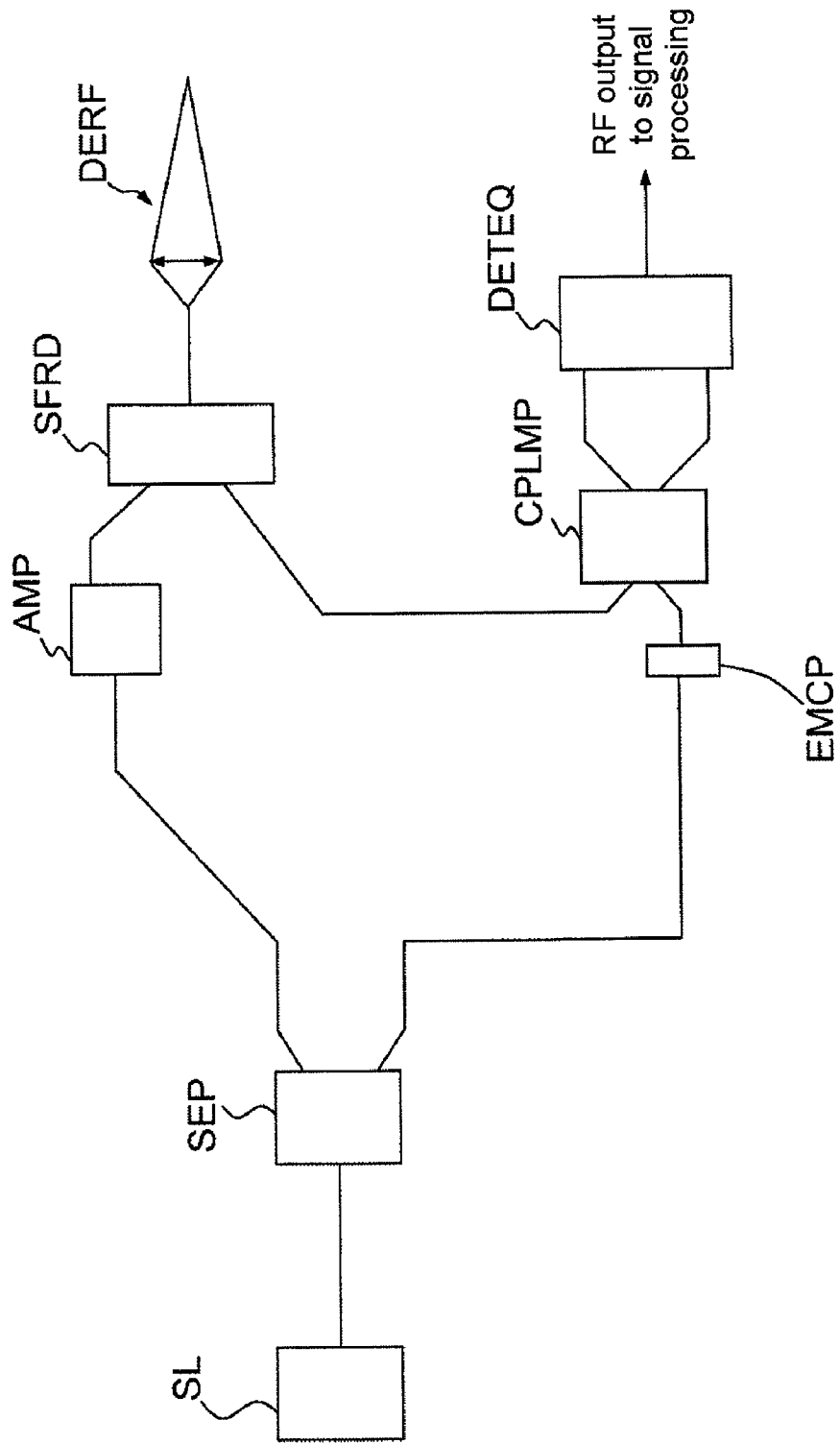
FIG. 1 illustrates an existing mono-axial laser anemometry probe.
Figure 2:
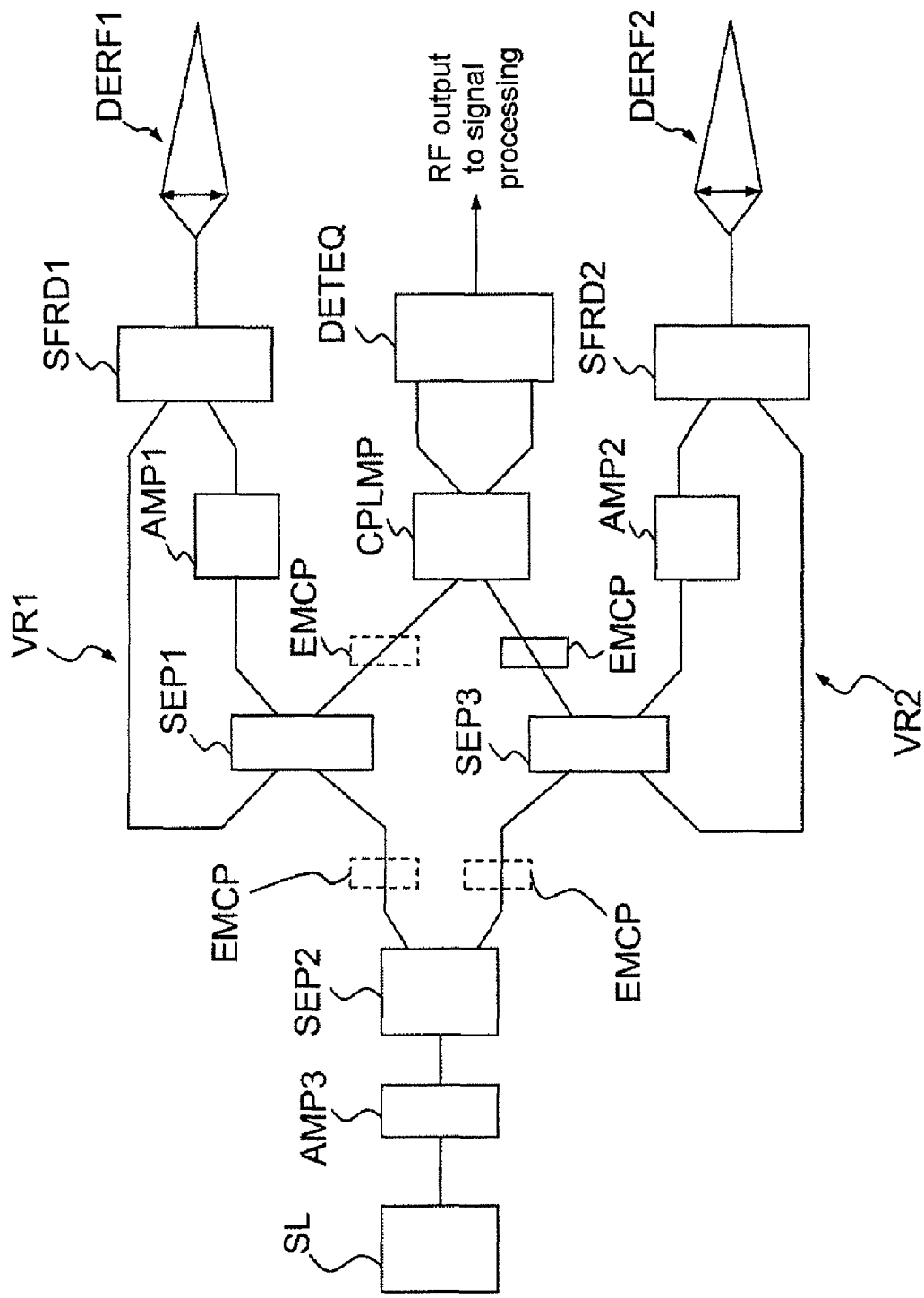
FIG. 2 illustrates a biaxial laser anemometry probe according to one aspect of the invention.

As illustrated in FIG. 2, a biaxial laser anemometry probe comprises a laser source SL supplying a linearly polarized reference wave, a first separator SEP1 separating the signal originating from the laser source SL into a signal transmitted to a first amplifier AMP1 and a signal transmitted to a coupler with maintained polarization CPLMP.

The biaxial laser anemometry probe also comprises a first device DERF1 for transmitting/receiving beams in a first direction, or, in a slight misuse of language, along a first axis, and a first backscattered beam separator SFRD1 arranged between the first amplifier AMP1 and the first transmitter/receiver device DERF1.

The biaxial laser anemometry probe is also provided with a second device DERF2 for transmitting/receiving beams in a second direction distinct from the first direction, or, in a slight misuse of language, along a second axis distinct or of different direction from the first axis, and with a second backscattered beam separator SFRD2 arranged between the second amplifier AMP2 and the second transmitter/receiver device DERF2.

The signal backscattered by the first transmitter/receiver device DERF1 is transmitted by the first backscattered beam separator SFRD1 to the first separator SEP1 via a first return pathway VR1. Similarly, the signal backscattered by the second transmitter/receiver device DERF2 is transmitted by the second backscattered beam separator SFRD2 to the third separator SEP3 via a second return pathway VR2.

The first backscattered beam separator SFRD1 transmits, or, in other words, allows to pass, the signal originating from the first amplifier AMP1 to the first transmitter/receiver device DERF1, and transmits the backscattered beam originating from the first transmitter/receiver device DERF1 to the first return pathway VR1 with a polarization of the wave turned by 90° relative to the wave received from the first amplifier AMP1. Similarly, the second backscattered beam separator SFRD2 transmits, or, in other words, allows to pass, the signal originating from the second amplifier AMP2 to the second transmitter/receiver device DERF2, and transmits the backscattered beam originating from the second transmitter/receiver device DERF2 to the second return pathway VR2 with a polarization of the wave turned by 90° relative to the wave received from the second amplifier AMP2.

The biaxial laser anemometry probe also comprises a polarization consistency element EMCP arranged upstream of the coupler with maintained polarization CPLMP, and a balanced detector DETEQ arranged downstream of the coupler with maintained polarization CPLMP.

The two output signals from the coupler with maintained polarization are transmitted to the balanced detector DETEQ which, for example, comprises two diodes, and delivers as output the difference in the signals supplied by the two diodes. The output signal from the balanced detector DETEQ is then transmitted to an electronic control unit that is not represented, to be processed. The implementation of balanced detection makes it possible to do away with the intensity noise from the laser source SL.

A third amplifier AMP3, optional, is arranged between the laser source SL and the second separator SEP2, to amplify the laser source, if necessary, so that the powers transmitted respectively to the two beam transmitter/receiver devices DERF1 and DERF2 are sufficient.

As represented by broken lines in FIG. 2, the polarization consistency element EMCP can immaterially be arranged between the first separator SEP1 and the coupler with maintained polarization CPLMP, between the third separator SEP3 and the coupler with maintained polarization CPLMP, between the second separator SEP2 and the first separator SEP1, or between the second separator SEP2 and the third separator SEP3.

The second separator SEP2 can be, for example, a 50/50 separator, transmitting identical intensities on its two outputs, addressed to the first and third separators SEP1 and SEP3. In this case, the power adjustments of the first and second amplifiers AMP1, AMP2 are facilitated because they are of low amplitude.

Furthermore, the first and third separators SEP1, SEP3 can, for example, be 90/10 separators, transmitting 90% of the signal originating from the second separator SEP2 to the corresponding amplifier AMP1, AMP2, and the remaining 10% of the signal originating from the second separator SEP2 to the coupler with maintained polarization CPLMP, and transmitting 90% of the signal received via the corresponding return pathway VR1, VR2 to the coupler with maintained polarization CPLMP, and the remaining 10% of the signal received via the corresponding return pathway to the corresponding amplifier AMP1, AMP2.

Thus, only 10% of the power of the backscattered signal is not used because it is redirected to the corresponding amplifier of the corresponding measurement pathway, whereas 90% of the power is used in the coherent mixture of the coupler with maintained polarization CPLMP. Also, since 10% of the reference wave obtained from the second separator SEP2 is directed to the coupler with maintained polarization CPLMP, the power needed at the output of the third amplifier AMP3 is low.

The present invention uses the fact that the backscattered signal oriented on the two return pathways VR1 and VR2 respectively by the first and second backscattered beam separators SFRD1 and SFRD2 is polarized orthogonally to the signal originating respectively from the first and second amplifiers AMP1 and AMP2 because the first and second backscattered beam separators SFRD are polarization separation devices. The rotation of polarization of the backscattered wave means using a polarization consistency element EMCP to be able to perform the coherent mixing of the backscattered wave and the reference wave. A polarization consistency element EMCP is used on a waveguide, for the reference wave of a pathway and for the backscattered signal of the other pathway in order to obtain two measurements according to two different polarizations that cannot therefore be disturbed by coherent mixing.

Figure 3:
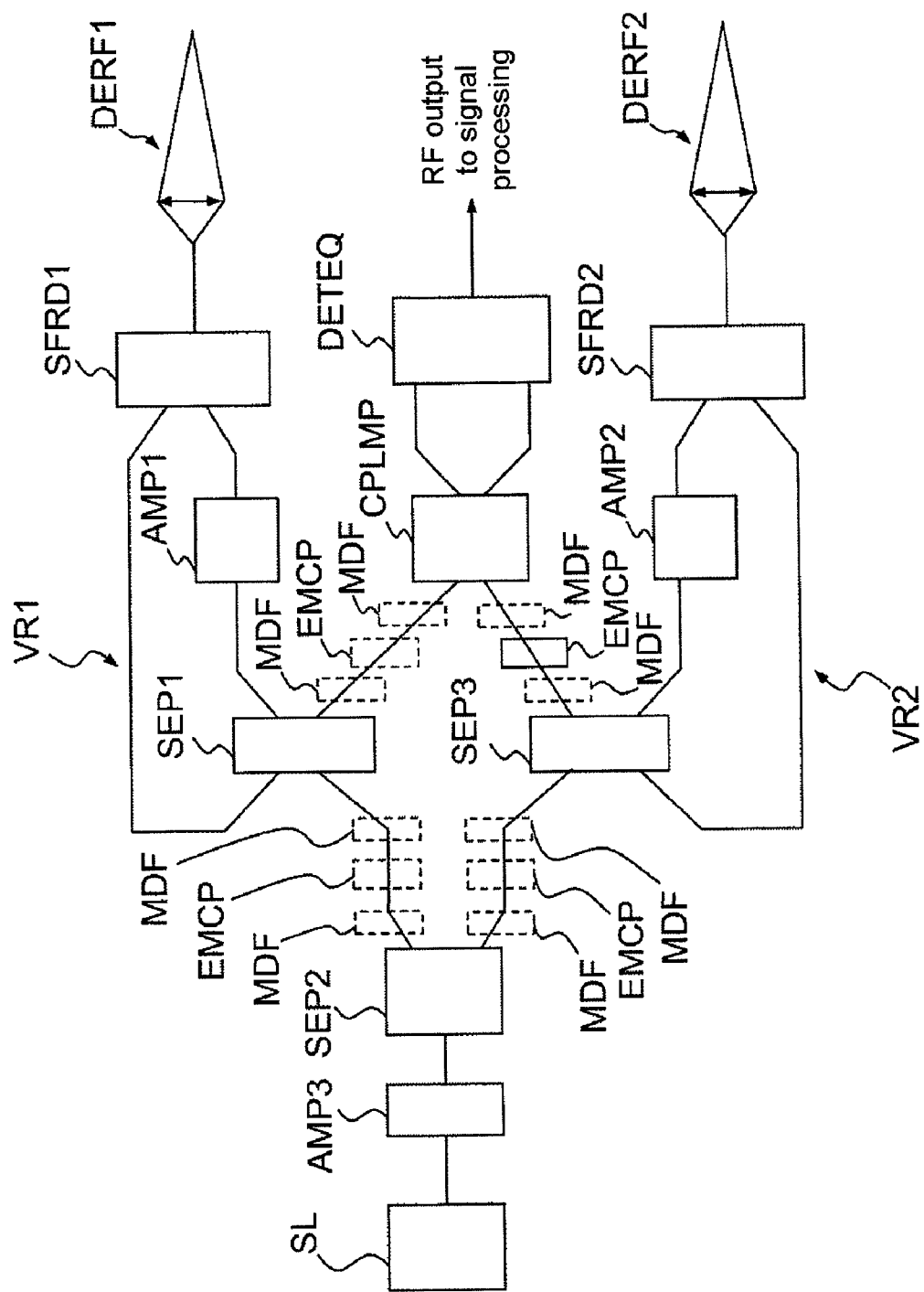
FIG. 3 illustrates a biaxial laser anemometry probe according to another aspect of the invention.

As a variant, as illustrated in FIG. 3, the biaxial laser anemometry probe can also comprise frequency offset means MDF arranged between the first separator SEP1 and the coupler with maintained polarization CPLMP, between the third separator SEP3 and the coupler with maintained polarization CPLMP, between the second separator SEP2 and the first separator SEP1, or between the second separator SEP2 and the third separator SEP3. Furthermore, the frequency offset means MDF can, according to the placement of the variable polarization consistency element EMCP described previously, be arranged upstream or downstream of the polarization consistency element EMCP.

In the present invention, for all of the embodiments, the rates of separation of the input signals of the first, second and third separators SEP1, SEP2, SEP3 are not limited to the 50/50 or 90/10 rates cited as examples; they can take any other desirable value. In practice, the three rates of separations of the first, second and third separators SEP1, SEP2, SEP3 can be optimized, according to the technical characteristics of the laser source SL and of the balanced detector DETEQ so as not to mask the signal either by the intensity noise of the laser source or by the noise of the balanced detector DETEQ.

The present invention therefore makes it possible to accurately determine the relative speed of an aircraft in relation to the surrounding air, at low cost, and with limited risk of failure.

What is claimed is:

1. A laser anemometry probe for optical homodyne detection of frequency offset by Doppler effect, comprising:
a laser source (SL) supplying a linearly polarized reference wave, a first separator (SEP1) of the signal originating from the laser source (SL) into a signal transmitted to a first amplifier (AMP1) and a signal transmitted to a coupler with maintained polarization (CPLMP),
a first device (DERF1) for transmitting/receiving beams in a first direction, a first backscattered beam separator (SFRD1) arranged between the first amplifier (AMP1) and the first transmitter/receiver device (DERF1) and transmitting the signal originating from the first amplifier (AMP1) to the first transmitter/receiver device (DERF1),
a polarization consistency element (EMCP) arranged upstream of the coupler with maintained polarization (CPLMP), and a balanced detector (DETEQ) arranged downstream of the coupler with maintained polarization (CPLMP),
and further comprising a second separator (SEP2) arranged between the laser source (SL) and the first separator (SEP1) to separate the signal obtained from the laser source (SL) into two signals addressed respectively to the first separator (SEP1) and a third separator (SEP3) for separating the signal originating from the laser source (SL) into a signal transmitted to a second amplifier (AMP2) and a signal transmitted to the coupler with maintained polarization (CPLMP), a second device (DERF2) for transmitting/receiving beams in a second direction distinct from the first direction, a second backscattered beam separator (SFRD2) arranged between the second amplifier (AMP2) and the second transmitter/receiver device (DERF2) and transmitting the signal originating from the second amplifier (AMP2) to the second transmitter/receiver device (DERF2), and a first and a second return pathways (VR1, VR2) for respectively transmitting the signal backscattered from the first backscattered beam separator (SFRD1) at the input of the first separator (SEP1), and the signal backscattered from the second backscattered beam separator (SFRD2) at the input of the third separator (SEP3).

2. The laser anemometry probe according to claim 1, further comprising a third amplifier (AMP3) arranged between the laser source (SL) and the second separator (SEP2).

3. The laser anemometry probe according to claim 1, in which said polarization consistency element (EMCP) is arranged between the first separator (SEP1) and the coupler with maintained polarization (CPLMP), or between the third separator (SEP3) and the coupler with maintained polarization (CPLMP).

4. The laser anemometry probe according to claim 1, in which said polarization consistency element (EMCP) is arranged between the second separator (SEP2) and the first separator (SEP1), or between the second separator (SEP2) and the third separator (SEP3).

5. The laser anemometry probe according to claim 1, further comprising frequency offset means (MDF) arranged between the first separator (SEP1) and the coupler with maintained polarization (CPLMP), or between the third separator (SEP3) and the coupler with maintained polarization (CPLMP).

6. The laser anemometry probe according to claim 1, further comprising frequency offset means (MDF) arranged between the second separator (SEP2) and the first separator (SEP1), or between the second separator (SEP2) and the third separator (SEP3).

7. The laser anemometry probe according to claim 1, in which the second separator (SEP2) is a 50/50 separator, transmitting identical intensities on both its outputs, addressed to the first and third separators (SEP1, SEP3).

8. The laser anemometry probe according to claim 1, in which the first and third separators (SEP1, SEP3) are 90/10 separators, transmitting 90% of the signal originating from the second separator (SEP2) to the corresponding amplifier (AMP1, AMP2), and the remaining 10% of the signal originating from the second separator (SEP2) to the coupler with maintained polarization (CPLMP), and transmitting 90% of the signal received via the corresponding return pathway (VR1, VR2) to the coupler with maintained polarization (CPLMP), and the remaining 10% of the signal received via the corresponding return pathway to the corresponding amplifier (AMP1, AMP2).

9. A method of etching on glass plate, by integrated optical technology, a laser anemometry probe according to claim 1.

* * * * *